(12) United States Patent
Michaelis

(10) Patent No.: US 6,993,125 B2
(45) Date of Patent: Jan. 31, 2006

(54) VARIABLE SIDETONE SYSTEM FOR REDUCING AMPLITUDE INDUCED DISTORTION

(75) Inventor: Paul R. Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 310 days.

(21) Appl. No.: 10/383,023

(22) Filed: Mar. 6, 2003

(65) Prior Publication Data
US 2004/0174989 A1 Sep. 9, 2004

(51) Int. Cl.
*H04M 1/00* (2006.01)

(52) U.S. Cl. .................. 379/391; 379/392; 379/402

(58) Field of Classification Search ............... 379/391, 379/392, 402

See application file for complete search history.

(56) References Cited

U.S. PATENT DOCUMENTS

| | | | | |
|---|---|---|---|---|
| 3,963,876 A | * | 6/1976 | Holtz et al. | 379/391 |
| 5,170,430 A | * | 12/1992 | Schuh | 379/395 |
| 5,555,300 A | * | 9/1996 | Gutzmer | 379/395 |
| 5,640,450 A | * | 6/1997 | Watanabe | 379/392 |
| 5,649,008 A | * | 7/1997 | Bader et al. | 379/392 |
| 5,946,391 A | * | 8/1999 | Dragwidge et al. | 379/391 |
| 6,801,623 B1 | * | 10/2004 | Carter | 379/391 |

* cited by examiner

*Primary Examiner*—Jefferey F. Harold
(74) *Attorney, Agent, or Firm*—Patton Boggs LLP

(57) ABSTRACT

The variable sidetone system provides an enhanced method for inducing the subscriber maintain the amplitude of their voice at an appropriate level by exaggerating the amplitude characteristics of the sidetone returned to the subscriber. Rather than have the sidetone level linked to the amplitude of the subscriber's voice signal in a linear non-adjustable 1:1 relationship (as is done in the prior art), the present variable sidetone system implements an adjustable relationship between the amplitude of the subscriber's voice signal and sidetone levels, thereby allowing the variable sidetone system to provide the necessary acoustic feedback to subscribers to maintain the subscriber's voice signal within the predetermined bounds of the voice encoder.

12 Claims, 4 Drawing Sheets

TRADITIONAL SIDETONE BEHAVIOR

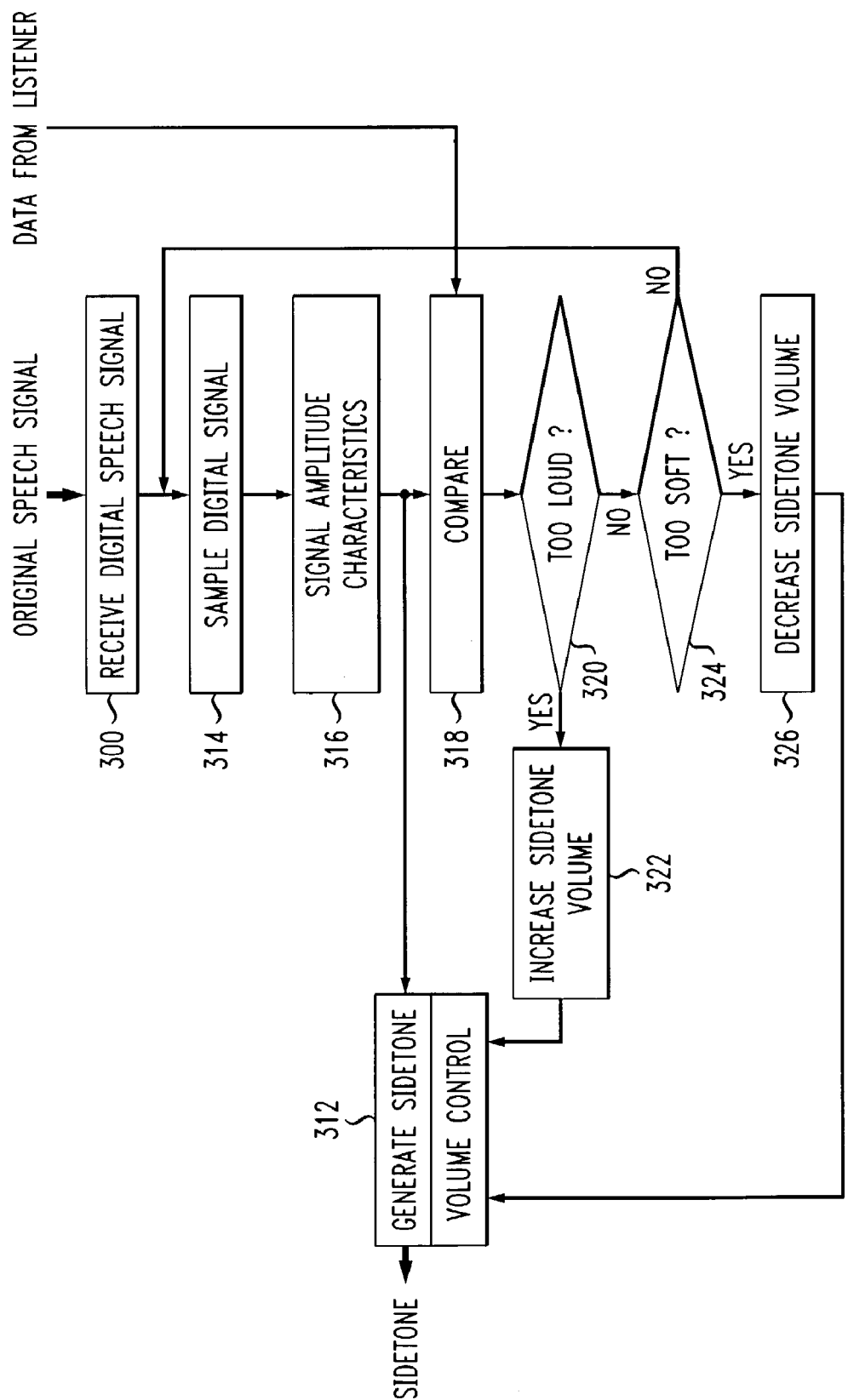

VARIABLE SIDETONE SYSTEM FOR REDUCING AMPLITUDE INDUCED DISTORTION

FIELD OF THE INVENTION

The invention relates to telephone systems, and in particular to a variable sidetone signal returned by the telephone system to a subscriber's digital telephone.

PROBLEM

It is a problem in the field of telephone systems to provide a clear representation of a subscriber's voice to a listener, located at the other end of the telephone line, when the amplitude of the subscriber's voice exceeds or falls below optimal input levels.

In traditional telephone systems, a subscriber receives feedback to control the volume of the subscriber's voice via the use of a sidetone signal. Essentially, this is an electronic mechanism for feeding a predetermined portion of the subscriber's voice signal back to their own ear as they speak, compensating for the fact that their ear is covered by the telephone receiver. It is a well known phenomenon that people tend to speak more loudly on systems that have low sidetone levels (as is often the case with wireless telephones), and more softly on systems that have loud sidetone levels.

It is important to note that traditional telephone systems attempt to maintain a 1:1 linear relationship between the input amplitude (measured at the telephone's microphone) of the subscriber's voice and the resulting sidetone amplitude (measured at the telephone's speaker). Typically, a change in the input amplitude of the subscriber's voice is reflected by a change of similar magnitude and direction in the sidetone amplitude. Traditionally, in wire-line analog telephone systems, the sidetone signal is generated by a simple two-wire to four-wire hybrid circuit within the telephone. In wire-line digital telephone systems, the sidetone signal is most often generated in the switch, while most wireless systems implement the sidetone signal generation in the telephone.

A problem associated with these traditional sidetone mechanisms is that the feedback they provide to subscribers tends to be inadequate, in that subscribers are often unaware when they are speaking too loudly or too softly. The effect on the transmitted voice signal when the amplitude of the subscriber's input voice signal is too low is that the amplitude and/or signal-to-noise ratio of the reproduced voice signal at the listener's telephone is lower than when the subscriber's input voice signal is at an appropriate level. This can harm intelligibility of the reproduced voice signal because important low-amplitude speech components, such as unvoiced fricative sounds (e.g., "S" and "F" sounds) and unvoiced plosive sounds (e.g., "T" and "P" sounds), may drop below the listener's threshold of detectability. When the amplitude of the subscriber's input voice signal is too high, there is audio distortion in the reproduced voice signal at the listener's telephone in both analog systems and digital systems that use simple encoding schemes (i.e., schemes that digitally encode the shape of the original analog waveform, such as the "WAV" format seen on personal computers or the Pulse Code Modulation techniques used in basic digital telephone systems). When the amplitude of the subscriber's voice exceeds the maximum value permitted by the encoding system, the inability to encode the amplitude extremes results in a flattening of the peaks and valleys of the original speech waveform. Typically, this amplitude-clipping has a noticeable effect on the intelligibility and aesthetics of the reproduced voice signal but is not objectionable if the subscriber's input voice signal only occasionally exceeds the encoder's maximum level.

In contrast, when low-bit-rate voice encoders such as LPC (Linear Predictive Coding) and CELP (Code Excited Linear Prediction) are overdriven, even by modest amounts, the effect on intelligibility and aesthetics of the reproduced voice signal can be enormous and unacceptable. The reason is that these low-bit-rate encoders achieve their reductions in data rate by encoding the spectral characteristics of the subscriber's input voice signal, rather than the shape of the speech waveform. Keeping in mind that the typical input for these encoders is a signal that has been digitized in WAV or PCM-type formats, the introduction of an amplitude-clipped signal to the low-bit-rate encoders initiates a sequence of events that has an undesirable outcome:

(1) When the encoders encounter a clipped signal, they incorrectly assume that the original signal contained frequencies that are, in fact, harmonics of the clipped signal.

(2) Based on this incorrect information, the encoders then compute erroneous values for the key variables in the speech production model, such as the value commonly referred to as f(0) ("F sub zero"), which corresponds to the fundamental periodicity of the voice being digitized.

(3) When these erroneously encoded signals are reconverted to analog format for playback to a listener, the output voice signals often contain distortions such as clicks, static, and pitch doubling.

Typically, the perceived quality of the speech contained in the reproduced output voice signals is far worse than a similarly clipped signal had it stayed entirely in analog, WAV, or PCM format.

In many telephone systems, the problem of the subscriber speaking too loudly or too softly is mitigated somewhat by the use of Automatic Gain Control (AGC) mechanisms. Although AGC can be of considerable benefit, it is not by itself an entirely satisfactory solution; it often does not respond with sufficient speed or accuracy when the audio environment changes, plus it has a tendency to distort the shape of the original speech waveform in a way that introduces undesirable harmonics. This is why professional recording studios and broadcast radio stations rarely rely on AGC systems for amplitude control. Typically, people at these locations monitor the signal amplitudes visually on devices such as "VU" meters, and then adjust the signal levels manually.

Given that the present AGC mechanisms are not ideal solutions for the problem, and given also the root cause of the problem in telephone systems is that people are speaking too loudly or too softly (and are often unaware when they are doing so), a need exists for an audio feedback mechanism that encourages telephone subscribers to speak at an appropriate level to maintain the subscriber's voice signal within the predetermined bounds of the voice encoder.

Solution

The above-described problems are solved and a technical advance achieved by the present variable sidetone system for reducing amplitude induced distortion (termed "variable sidetone system" herein), which provides an enhanced method for inducing the subscriber maintain the amplitude of their voice at an appropriate level by exaggerating the amplitude characteristics of the sidetone returned to the subscriber. Rather than have the sidetone level linked to the amplitude of the subscriber's voice signal in a linear non-adjustable relationship (as is done in the prior art), the present variable sidetone system implements an adjustable relationship between the amplitude of the subscriber's voice signal and sidetone levels, thereby allowing the variable sidetone system to provide the necessary acoustic feedback to subscribers to maintain the subscriber's voice signal within the predetermined bounds of the voice encoder.

The variable sidetone system continuously samples the incoming speech signal (i.e., the subscriber's voice) and also determines amplitude-related parameters of the incoming speech signal. Illustratively, these amplitude-related parameters might include descriptions of short-term amplitude spikes and the average amplitude levels within specific time windows. The purpose of these amplitude-related parameters is to permit an automatic analyzer to determine whether the speech amplitude is exceeding or falling below the optimal input level of the digital encoder. When a non-optimal condition is detected, the sidetone amplitude is automatically varied, with an exaggerated amplitude boost when the subscriber is speaking too loudly and exaggerated amplitude attenuation when the subscriber is speaking too softly. The expectation is that this overcompensation in the sidetone signal encourages subscribers to make appropriate adjustments to how loudly they are speaking. In an alternative embodiment, when the amplitude of the subscriber's voice is significantly below desired levels, the amplitude of the sidetone signal is not just reduced, it is eliminated entirely. In another embodiment, when the subscriber is speaking much too loudly, deliberate distortion is added to the already loud sidetone signal, further emphasizing to the subscriber that they should speak more softly.

Although the above embodiments describe an automatic mechanism, the control of the subscriber's sidetone amplitude could just as easily be under the manual control of the other party on the call. For example, if a listener is having trouble hearing because the subscriber is speaking too softly, the listener can send a signal to the communication system that causes the subscriber's sidetone amplitude to decrease, thereby motivating the subscriber to speak more loudly.

BRIEF DESCRIPTION OF THE DRAWINGS

FIG. 7 illustrates, in flow diagram form the operation of the present variable sidetone system in producing a variable sidetone signal and controlling its levels in order to reduce amplitude-induced distortion.

DETAILED DESCRIPTION

The variable sidetone system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
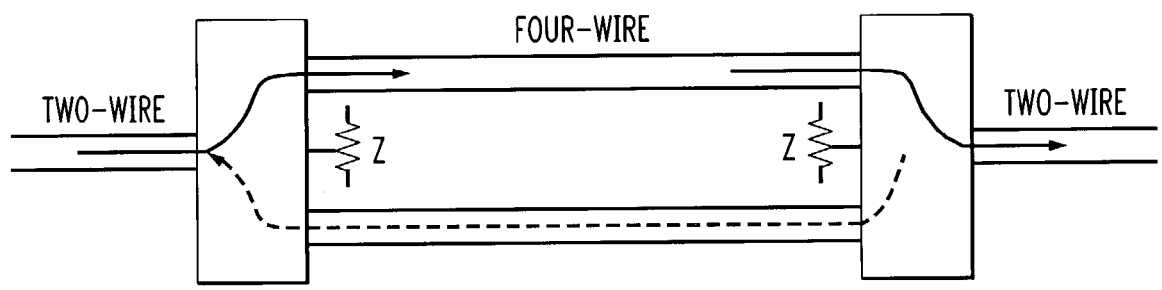
FIG. 1 illustrates, in schematic diagram form, the analog sidetone generation at a two-wire to four-wire interface of the prior art.

A traditional analog telephone is designed to couple a predetermined portion of the subscriber's voice signal, referred to as a sidetone signal, back into the subscriber's telephone earpiece. Essentially, a sidetone circuit is an electronic mechanism for feeding the subscriber's speech back to their own ear as they speak, compensating for the fact that their ear is covered by the telephone receiver. Without sidetone, a telephone sounds dead to the subscriber while they are speaking. In an analog telephone, the sidetone signal is introduced at a two-wire to four-wire interface, as illustrated in the schematic diagram of FIG. 1, where the subscriber's voice signal on the incoming branch of the four-wire circuit is coupled to the outgoing branch of the four-wire circuit and thereby returns to the subscriber's telephone (as shown by the dotted line path).

In a digital telephone system, the subscriber's voice signal is not automatically coupled back to the subscriber's telephone, as in the analog telephone case. Instead, a sidetone circuit produces a sidetone signal representative of a predetermined portion of the received subscriber's voice signal and feeds the generated sidetone signal back to the subscriber's telephone. As illustrated in graphical form in FIG. 2, the magnitude of the generated sidetone signal 10 is traditionally a linear representation of the incoming speech signal, in that the sidetone amplitude 12 varies on a 1:1 scale with the input amplitude 14. (The important point here is that, although the amplitude of the sidetone with respect to the amplitude of the input signal varies from telephone to telephone—in other words, some phones tend to have louder sidetone than others—the characteristic behavior of any given phone is that a variation in the input level has a corresponding 1:1 effect on the sidetone level.)

In telephone configurations that employ low-data-rate digital speech encoding, such as: voice mail, digital wireless, and Voice over IP systems (VoIP), the range of acceptable input amplitudes tends to be much narrower than the acceptable range for analog and high-data-rate digital systems. With these low-data-rate systems, significant distortion is introduced when the amplitude of the original speech signal exceeds the maximum value permitted by the encoding scheme. In the simpler, high-data-rate encoding schemes (i.e., schemes that digitally encode the shape of the original analog wave, such as the "WAV" format seen on personal computers or the Pulse Code Modulation techniques used in basic digital telephone), the inability to encode amplitude extremes often results in a flattening, or squaring, of the peaks and valleys of the original waveform. Typically, the effect this amplitude-clipping has on the intelligibility and aesthetics of speech is noticeable, but not objectionable, if the input signal only occasionally exceeds the encoder's maximum threshold.

By contrast, when low-bit-rate encoders are overdriven, even by modest amounts, the effect on intelligibility and aesthetics can be enormous and unacceptable. The reason is that the low-bit-rate encoders, such as LPC (Linear Predictive Coding) and CELP (Code Excited Linear Prediction), achieve their reductions in data rate by encoding the spectral characteristics of the signal, rather than the shape of the waveform.

Since the typical input for these encoders is a signal that has been digitized in WAV or PCM-type (Pulse Code Modulation) formats, the introduction of an amplitude-clipped signal to the low-bit-rate encoders initiates a sequence of events that has an undesirable outcome. When the encoder encounters a clipped signal, the encoder incorrectly assumes that the original signal contains frequencies that are, in fact, harmonics of the original signal. Based on this incorrect information, the encoder computes erroneous values for the key variables in the speech production model, such as the value commonly referred to as f(0) ("F sub zero"), which corresponds to the fundamental periodicity of the speech being digitized. When this signal is reconverted to analog format, for playback to a listener, it often contains distortions such as clicks, static, and pitch doubling. Typically, the perceived quality of the speech is far worse than a similarly clipped signal would have been, had it stayed entirely in WAV or PCM format.

Figure 2:
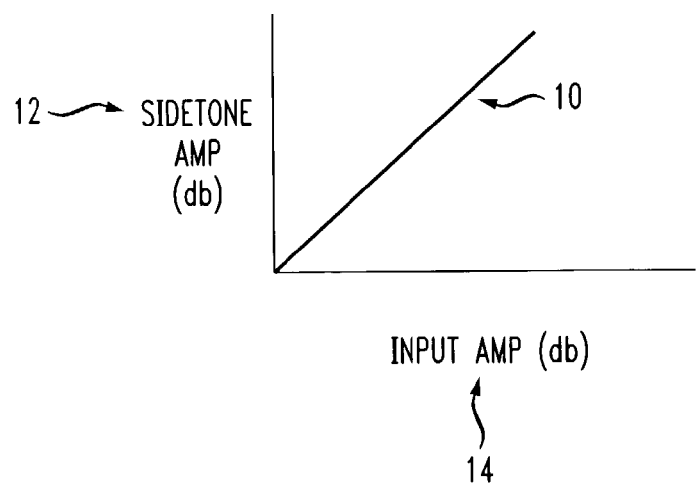
FIG. 2 illustrates a graphic representation of the operation of a linear sidetone mechanism of the prior art.

For this reason, in systems that employ low-data-rate speech encoding, an electronic sidetone with characteristics similar to those of standard telephones does not yield consistently satisfactory results. FIG. 2 illustrates the behavior of a standard sidetone mechanism, and thereby illustrates the problem for systems that are intolerant of modest amplitude extremes: when input amplitude and sidetone amplitude vary on the traditional 1:1 relationship, the sidetone signal does not "grab" the subscriber's attention when the input amplitude is of sufficient magnitude to cause distortion in the transmitted signal.

Traditional Sidetone System

In traditional telephone systems, subscribers receive feedback about how loudly they are speaking through the telephone system's sidetone path. It is a well known phenomenon that subscribers tend to speak more loudly on telephones that have low sidetone levels, and speak more softly on telephones that have high sidetone levels.

Figure 3:
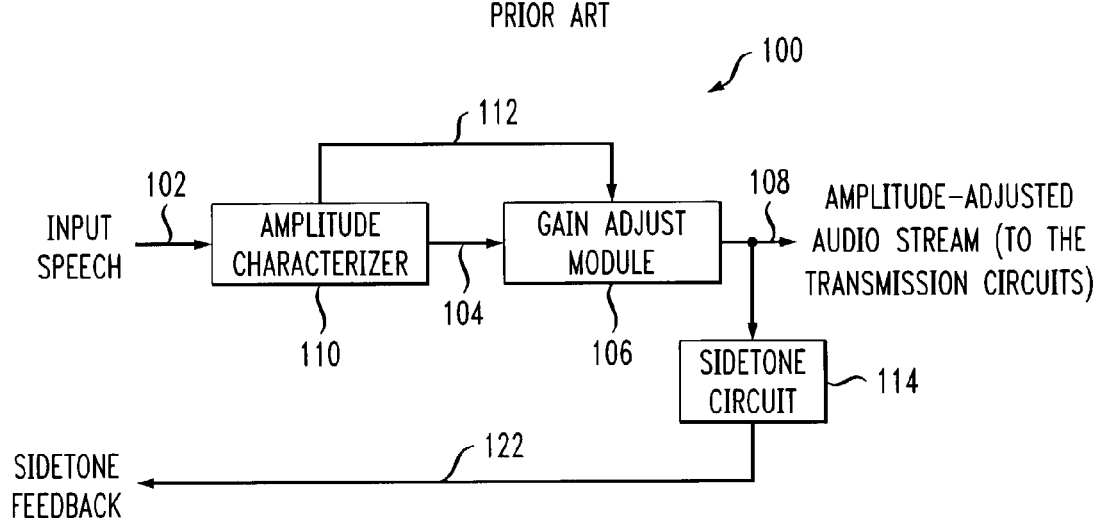
FIG. 3 illustrates, in block diagram form, the architecture of a typical digital sidetone circuit of the prior art.

FIG. 3 illustrates, in block diagram form, a typical prior art Automatic Gain Control (AGC) circuit. Since the sidetone circuit and the encoding can be implemented in a variety of ways, these implementation details are not included in the illustration. Many digital telephone systems contain an Automatic Gain Control (AGC) mechanism, which may be implemented in hardware, firmware or software. Regardless of the means of implementation, the purpose of AGC mechanisms is consistent: they monitor the amplitude of the incoming signals and, if necessary, reset the amplitude of these signals to acceptable levels prior to delivery to the transmission circuit of the telephone system. In the example illustrated in FIG. 3, the digital telephone system includes an Automatic Gain Control (AGC) 100 that receives the input speech 102. The amplitude-characterizer 110 of the AGC 100 samples the input speech 102 over a period of time and computes one or more parameters that represent the amplitude characteristics of the sample. These parameters then serve as amplitude parameter feedback 112, governing the volume control of the gain adjustment module 106, which appropriately increases or attenuates the speech signal 104 to produce the amplitude-adjusted audio stream 108 which is delivered to both the sidetone circuit 114 and the transmission circuit of the telephone system. The amplitude-characterizer 110 and the corresponding gain adjustment module 106 may be located in the digital telephone, a PBX, or a central office switch. It is important to note that, in traditional telephone systems, the amplitudes of the amplitude-adjusted audio stream 108 and the sidetone signal 122 are locked to each other. A modification in the operation of the gain adjustment module 106 necessarily has the same effect on the amplitude-adjusted audio stream 108 and on the sidetone signal 122.

Variable Sidetone System

Figure 4:
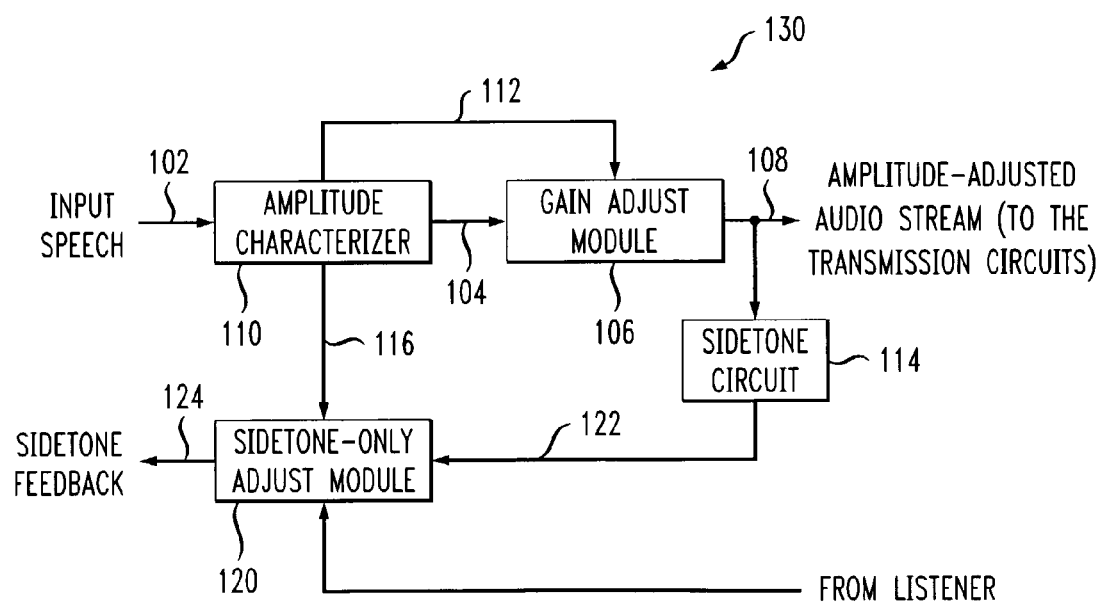
FIG. 4 illustrates, in block diagram form, the architecture of the present variable sidetone system.

The block diagram of FIG. 4 illustrates the architecture of the present variable sidetone system 130. In this example, the input speech 102 of the subscriber is received by the amplitude-characterizer 110 which samples the input speech 102 over a period of time and computes one or more parameters that represent the amplitude characteristics of the sample. These parameters then serve as amplitude parameter feedback 112, governing the volume control of the gain adjustment module 106, which appropriately increases or attenuates the speech signal 104 to produce the amplitude-adjusted audio stream 108 which is delivered to both the sidetone circuit 114 and the transmission circuit of the telephone system. However, a second set of amplitude parameters 116 is routed to a sidetone-only adjust module 120, wherein the traditional sidetone 122 from the sidetone circuit 114 is appropriately increased or attenuated, as described below.

If the input speech 102 is too loud, the amplitude parameters 116 transmitted to the sidetone-only adjust module 120 cause the sidetone-only adjust module 120 to increase the sidetone amplitude in excess of what would be seen in the traditional sidetone signal 122. By contrast, if the input speech 102 is too soft, the amplitude parameters 116 transmitted to the sidetone-only adjust module 120 cause the sidetone-only adjust module 120 to decrease the sidetone amplitude below what would be seen in a traditional sidetone signal 122.

In an alternative embodiment, when the input speech is excessively loud, the sidetone-only adjuster 120 becomes a source of deliberate sidetone distortion introduced into the sidetone signal 122 to further induce the subscriber to lower their speech volume.

With regard to the above example, it is important to note that the specific relationship between the values of the parameters in the second set of amplitude parameters 116 and the resulting adjustment of sidetone amplification varies among the different embodiments. In fact, the action of the second set of amplitude parameters 116 on the sidetone amplitude can be in the opposite direction of the adjustment to the amplitude-adjusted audio stream 108 by the gain adjustment module 106: conditions under which the AGC would cause the transmit amplitude to be attenuated now are the conditions under which the sidetone amplitude is boosted, and vice versa.

In a different class of embodiments, the signal that adjusts the sidetone level (shown in FIG. 4 as 116) is not generated by an amplitude characterizer within the subscriber's telephone system, but is instead under the control of a listener at the far end. (In this embodiment, the listener at the far end might be another person, but could also be a distortion-sensitive device such an Automatic Speech Recognition system.) A hybrid architecture, in which the subscriber's sidetone characteristics are governed by both the listener and by an automatic mechanism within the subscriber's telephone system, is not precluded.

The anticipated effect of this manipulation of the sidetone levels is that subscribers are encouraged to adjust how loudly they are speaking and subscribers will maintain their voices at the optimal level for the telephone system's digital speech encoder. As a result, the quality of the transmitted speech signal is superior to that achieved by systems that rely solely on the AGC to adjust the gain of the transmitted signal.

Variable Sidetone Signal Relationships

Figure 5:
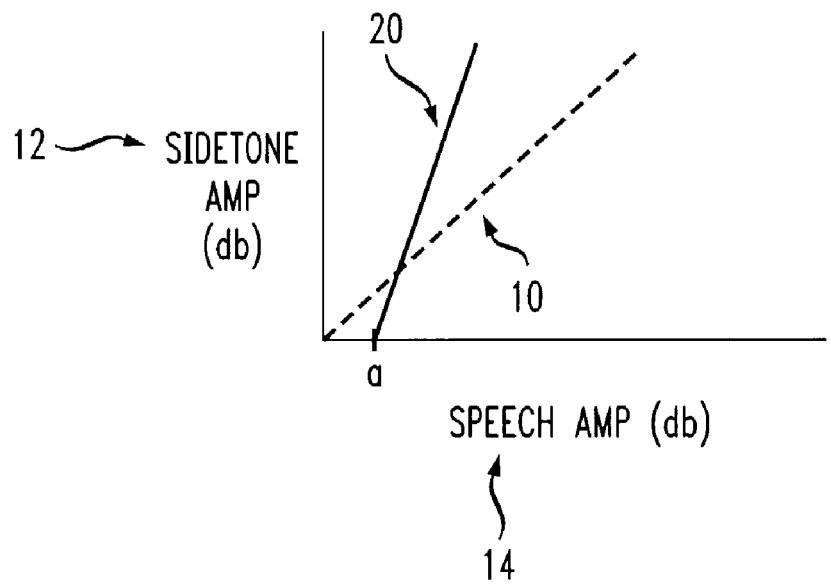
FIG. 5 illustrates a graphic representation of the relationship between the subscriber's speech amplitude and the resulting sidetone amplitude in one embodiment of the present variable sidetone system.

An illustrative example of the operation of the variable sidetone system 130 is shown in FIG. 5, which graphs the relationship between the subscriber's voice amplitude and the resulting sidetone amplitude. When compared with a traditional telephone system sidetone signal 10, the relationship between the input speech amplitude and the amplitude of the variable sidetone system 130 sidetone signal 20 is exaggerated. When the speech volume of the subscriber is too low, the exaggerated attenuation of the sidetone amplitude yields a signal with little or no speech, sounding to the subscriber like a dead telephone. The lack of easily detectable speech in the sidetone signal induces the subscriber to speak more loudly. Similarly, when subscriber is speaking so loudly that the transmitted signal may be distorted, the present variable sidetone system provides an exaggerated boost to the sidetone amplitude, encouraging the subscriber to speak more softly.

Figure 6:
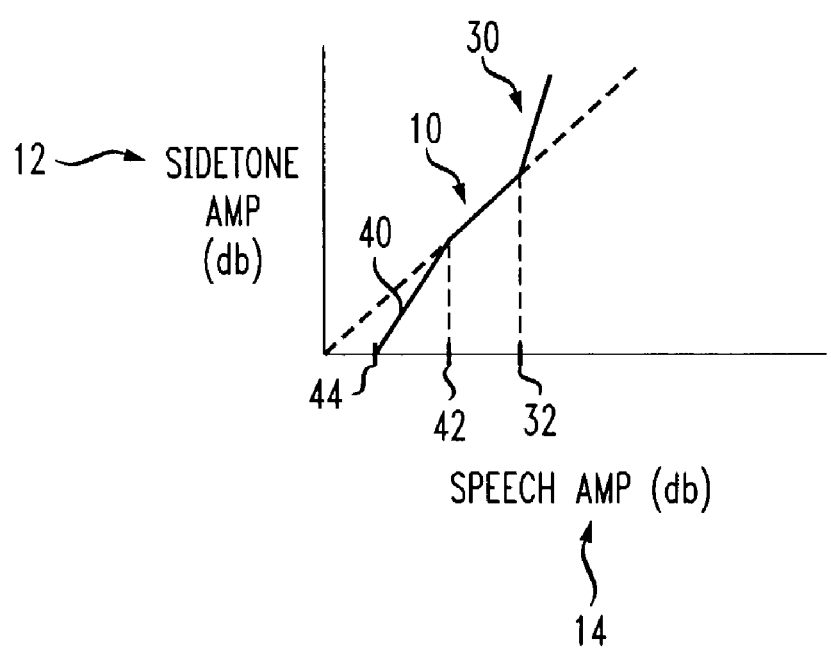
FIG. 6 illustrates a graphic representation of a non-linear relationship between the subscriber's speech amplitude and the resulting sidetone amplitude, thereby illustrating an alternative embodiment of the present variable sidetone system.

Another embodiment is illustrated by the graph of FIG. 6. As is the case with FIG. 5, the graph in FIG. 6 illustrates the relationship between the subscriber's speech amplitude 14 and the resulting sidetone amplitude 12 as generated by the variable sidetone system 130. In FIG. 6, however, two specific points are identified on the graph. Threshold 32 is the point beyond which the subscriber's voice is so loud that distortion is introduced in the sidetone signal by the variable sidetone system 130, while threshold 42 is the point below which the subscriber's voice is so soft that distortion is introduced in the sidetone signal by the variable sidetone system 130. When the amplitude of the subscriber's voice is between thresholds 32 and 42, the signal is within the optimal amplitude range for operation of the digital speech encoder. As is illustrated by the graph, the sidetone characteristics of the variable sidetone system 130 resemble those of a traditional telephone system only while the subscriber's voice amplitude is between thresholds 32 and 42. However, when the subscriber's voice amplitude exceeds threshold 32, or goes below threshold 42, the variable sidetone system 130 automatically exaggerates the sidetone characteristics (i.e., exaggerated boost when threshold 32 is exceeded, exaggerated attenuation when the input falls below threshold 42). Although the embodiment illustrated by FIG. 6 may be more complicated and expensive to implement than the embodiment illustrated in FIG. 5, it may be preferred by some subscribers because it provides a traditional, non-intrusive sidetone signal when the subscriber is speaking appropriately.

A variation of the mechanism described in FIG. 5, which is shown in FIG. 6, relies on two additional thresholds, threshold 34, which is above threshold 32, and threshold 44, which is below threshold 42. When threshold 34 is exceeded, the system could add deliberate distortion to the sidetone signal, thereby further emphasizing to the subscriber that they are speaking much too loudly. When the subscriber's voice is below threshold 44, the system could eliminate sidetone feedback entirely, thereby encouraging the subscriber to speak more loudly.

The examples outlined in this section are illustrative, and not intended to preclude the described mechanisms from being used in combination. For example, the one-threshold low-amplitude feedback mechanism described in FIG. 6 could be used in conjunction with the two-threshold high-amplitude feedback mechanism that is described subsequently.

Operation of the Variable Sidetone System

All embodiments of the variable sidetone system 130 rely on amplitude-characterizing techniques of the sort that are familiar to those skilled in the art of Automatic Gain Control (AGC) design. Given that many digital telephone systems already contain an AGC mechanism that characterizes the incoming speech signal, it is likely (but not required) that actual implementations of the present variable sidetone system 130 can leverage this inherent capability, rather than rely on a redundant amplitude-characterizer circuit to control the sidetone signal. For this reason, strictly for illustrative purposes, the operational flow diagram of FIG. 7 includes a component that is identified as the amplitude-characterizing component of an AGC circuit. The identification of this component by this name is not intended to preclude the use of a separate amplitude-characterizing circuit that is unrelated to the AGC.

In addition, solely for the purposes of illustration, the mechanism by which a traditional AGC circuit controls the transmission levels has been omitted from FIG. 7. The omission of this mechanism from the flow diagram does not imply that the mechanism would be omitted from an actual product. Rather, it is anticipated that this aspect of the traditional AGC mechanism would be retained, unmodified, in the majority of implementations.

Referring now to the operational flow diagram of FIG. 7, the digital telephone system includes an Automatic Gain Control (AGC) mechanism that receives the digital speech signal in step 300. The amplitude-characterizing component of the AGC mechanism samples the incoming speech signal in step 314 over a period of time and, in step 316, computes one or more parameters that represent the amplitude characteristics of the sample. (Illustrative examples of these parameters include the average amplitudes within specific time windows and characterizations of short-term amplitude spikes.) In step 318, the parameters are provided to a processor that controls the sidetone amplitude, such as sidetone-only adjust module 120 described above. Based on the values of these parameters, the sidetone-only adjust module 120 makes appropriate adjustments to the sidetone signal.

The operation of the sidetone-adjustment mechanism is illustrated as follows. Based on the values of the amplitude characterization parameters, the sidetone amplitude is varied at the sidetone circuit in step 312. If the incoming speech is too loud in step 320, the operation in step 322 may be to increase the sidetone amplitude and/or introduce deliberate sidetone distortion in step 312, where the sidetone is generated and transmitted back to the subscriber. When the input speech is too soft in step 324, the action of the sidetone circuit in step 326 may be to attenuate or even eliminate the sidetone in step 312.

In an alternate embodiment, the adjustment of the subscriber's sidetone characteristics is under the control of the listener as indicated by the provision of the input to step 318, termed "DATA FROM LISTENER" and as described above in the description of FIG. 4. (In this embodiment, the listener at the far end might be another person, but could also be a distortion-sensitive device such an Automatic Speech Recognition system.) A hybrid architecture, in which the subscriber's sidetone characteristics are governed by both the listener and by an automatic mechanism within the subscriber's telephone system, is not precluded.

The exaggeration of the sidetone characteristics, in the manner described above, accomplishes three objectives. The first is to provide auditory feedback that lets subscribers know when they are speaking too loudly, too softly, or at the proper level. The second is to provide this auditory feedback in a manner that encourages subscribers to make appropriate adjustments to their voices. The third is to reduce the likelihood that the subscriber's voice is at a level that requires intervention by the transmission-controlling component of the AGC mechanism, thereby reducing distortion of the speech signal that is transmitted to the listener. It is anticipated that the benefits are especially apparent in telephone systems that use low-data-rate speech encoding techniques. Illustratively, such telephone environments would include voice mail, wireless, and Voice over Internet Protocol (VoIP) systems; illustratively, low-data-rate speech encoding techniques that are especially sensitive to amplitude-induced distortion include Linear Predictive Coding (LPC) and Code Excited Linear Prediction (CELP).

Although the variable sidetone system and underlying principles have been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed:

1. A method for regulating a sidetone signal for use in a telephone that is connected to a telephone system, to induce a subscriber to change their speech volume, comprising:
   generating, in response to receipt of an input speech signal produced by said subscriber's speech input into said telephone and having an input speech amplitude, a first sidetone signal having a first sidetone amplitude; and
   varying said first sidetone amplitude to produce a second sidetone signal having a second sidetone amplitude that is independent of background noise disproportional to said input voice amplitude to overemphasize the subscriber's speech volume to induce the subscriber to adjust their speech volume.

2. The method of claim 1 wherein the step of varying comprises:
   increasing the first sidetone amplitude disproportional to the input speech amplitude when the subscriber's speech volume increases above a first threshold to induce the subscriber to decrease their speech volume; and
   attenuating the first sidetone amplitude disproportional to the input speech amplitude when the subscriber's speech volume falls below a second threshold to induce the subscriber to increase their speech volume.

3. The method of claim 2 further comprising:
   returning the first sidetone signal to the subscriber when the subscriber's speech volume is between the first threshold and the second threshold.

4. The method of claim 2 wherein the step of varying further comprises;
   distorting the second sidetone signal when the subscriber's speech volume increases above a third threshold, which is above the first threshold, to further induce the subscriber to decrease their speech volume.

5. The method of claim 2 wherein the step of varying further comprises;
   attenuating the second sidetone amplitude to an amplitude level wherein the second sidetone signal is not detectable by the subscriber when the subscriber's speech volume falls below a third threshold.

6. The method of claim 1 wherein a central office generates the first sidetone signal and transmits the first sidetone signal to the subscriber's telephone, the method further comprising:
   receiving an incoming signal at the central office from the telephone;
   analyzing the signal to determine the subscriber's speech volume; and
   varying the first sidetone amplitude of the first sidetone disproportional to the input speech amplitude at the central office.

7. The method of claim 1 wherein the subscriber telephone is a digital telephone and a PBX generates the first sidetone signal and transmits the first sidetone signal to the subscriber, the method further comprising:
   receiving a digital signal at the PBX from the digital telephone;
   analyzing the digital signal to determine the speech amplitude of the subscriber, and
   varying the first sidetone amplitude at the PBX to a level disproportional to the input speech amplitude.

8. The method of claim 7 wherein the digital telephone provides the first sidetone signal and the first sidetone amplitude is disproportionally varied at the digital telephone.

9. The method of claim 1 further comprising:
   receiving the input speech signal from the subscriber's telephone at a listener's telephone;
   generating data indicative of the subscriber's speech volume; and
   varying the first sidetone amplitude of the first sidetone signal disproportional to the input speech amplitude of the incoming signal as a function of said generated data.

10. A method for regulating a sidetone signal for use in a digital telephone that is connected to a telephone system, to induce a subscriber to change their speech volume where the digital telephone converts an input speech signal to a digital speech signal and returns a portion of the input speech signal to the subscriber in a linear sidetone signal having a first sidetone amplitude that varies on a 1:1 scale with an amplitude of the input speech signal, the method comprising:
   analyzing the digital speech signal over a period of time to determine an average speech amplitude; and
   varying the first sidetone amplitude in response to the average amplitude of the input speech signal to produce a second sidetone signal having a second sidetone amplitude independent of background noise wherein the second sidetone amplitude is disproportional to the amplitude of the input speech signal to overemphasize the subscriber's speech volume to induce the subscriber to adjust their speech volume.

11. The method of claim 10 wherein the step of varying the first sidetone amplitude comprises:

varying the first sidetone amplitude disproportional to the amplitude of the input speech signal with an exaggerated amplitude boost when the subscriber's speech volume increases above a first threshold to induce the subscriber to decrease their speech volume; and attenuating the first sidetone amplitude disproportional to the amplitude of the input speech signal with an exaggerated amplitude attenuation when the subscriber's speech volume falls below a second threshold to induce the subscriber to increase their speech volume.

12. The method of claim 11 further comprising:

returning the linear sidetone signal to the subscriber when the average amplitude of the input speech signal is between the first threshold and the second threshold.

* * * * *